March 19, 1929.  B. F. BERRY  1,706,207
TRANSMISSION MECHANISM FOR DRILLING MACHINES
Filed May 21, 1923
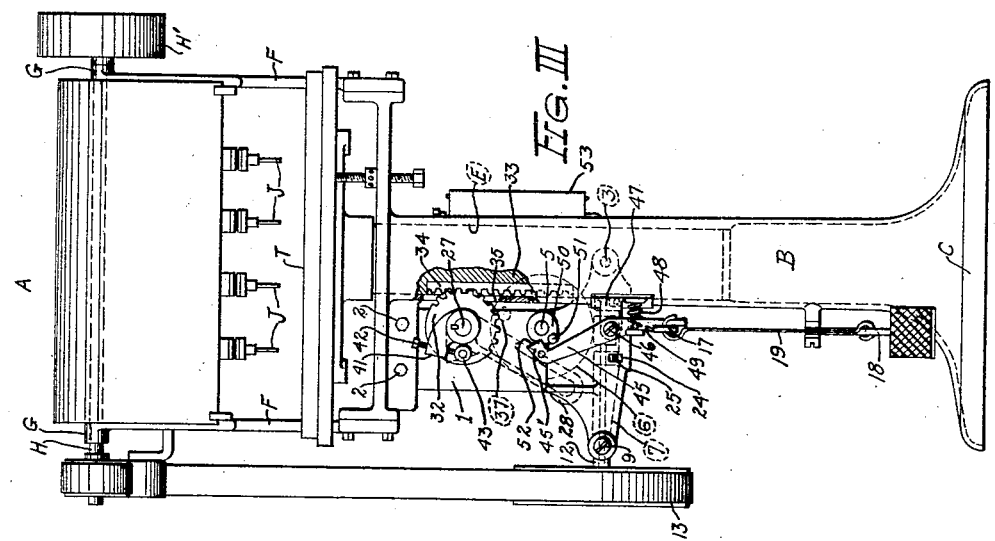
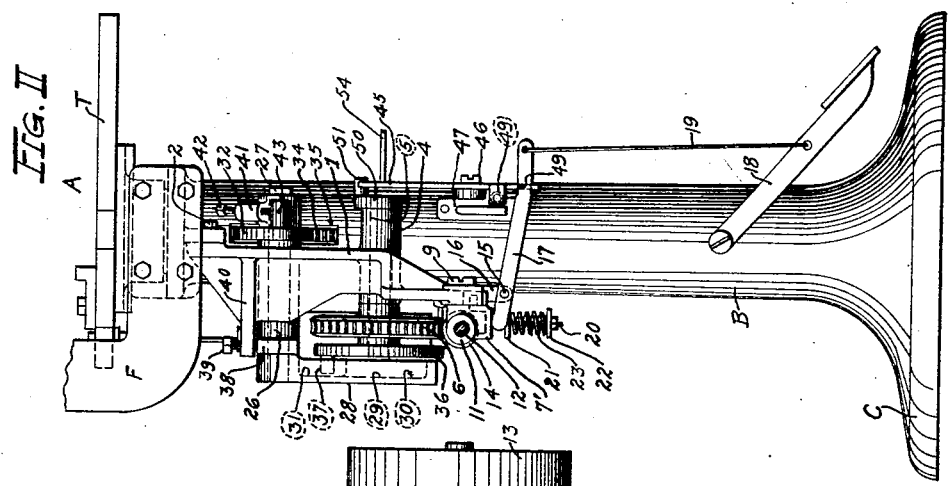
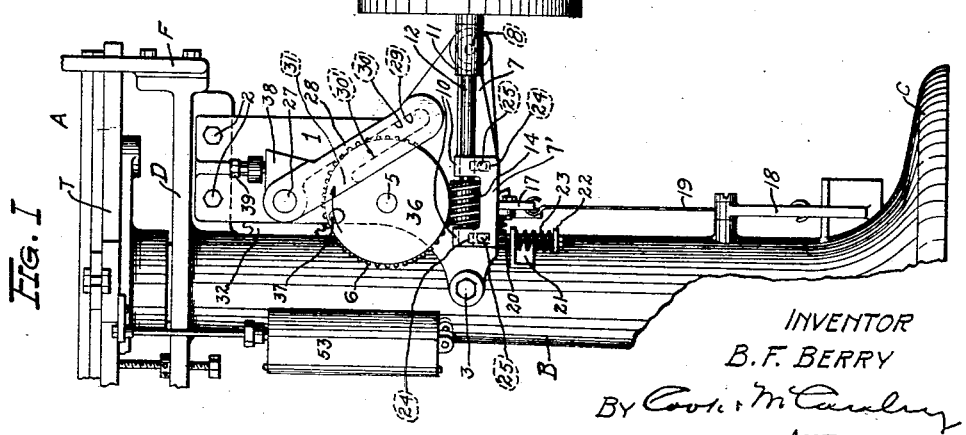
INVENTOR
B. F. BERRY
BY
ATTORNEYS Patented Mar. 19, 1929.

1,706,207

UNITED STATES PATENT OFFICE.

BENJAMIN F. BERRY, OF ST. LOUIS, MISSOURI, ASSIGNOR TO BERRY MACHINE COMPANY, OF ST. LOUIS, MISSOURI, A CORPORATION OF MISSOURI.

TRANSMISSION MECHANISM FOR DRILLING MACHINES.

Application filed May 21, 1923. Serial No. 640,419.

This invention relates generally to drilling machines, and particularly to a drilling machine of the type having a work-supporting table which is adapted to move toward the drilling or cutting tool, and the principal object of the invention is to provide a drilling machine of the type mentioned with comparatively simple mechanism whereby the movable work-supporting table thereof may be moved at an approximately uniform rate of speed throughout its distance of travel toward the drill or cutting tool of said machine.

Prior to this invention, the movable work-supporting tables of machines of the type mentioned above were moved toward the drills or cutting tools of said machines by means of pivoted levers and crank arms which were associated with said movable work-supporting tables, and because of the particular arrangement of said pivoted levers and crank arms the rate of speed at which said movable work-supporting table approached the drills or cutting tools was constantly changing. This varying speed of the work-supporting table prevented the machines heretofore used from functioning in a perfectly successful manner, for it is apparent that the speed of travel of the work-supporting tables could not be maintained at the speed which was found to be most desirable for perfect results. The drilling machine disclosed in the present application is provided with mechanism which will lift the work-supporting table toward the drill or cutting tool of said machine at an approximately uniform rate of speed whereby the objections recited above are eliminated.

Another object of my invention is to produce a drilling machine having mechanism for lifting the work-supporting table, which mechanism is so arranged that said work-supporting table may not be accidentally brought to a position where the drill or cutting tool may enter said work-supporting table.

With the foregoing and other objects in view, the invention comprises the novel construction, combination and arrangement of parts hereinafter more specifically described and illustrated in the accompanying drawings wherein is shown the preferred embodiment of the invention. However, it is to be understood that the invention comprehends changes, variations and modifications which come within the scope of the claims hereunto appended.

Fig. I is a fragmentary rear elevation of the lower portion of a drilling machine showing my transmission mechanism associated therewith, a portion of the standard of said machine being broken away to conserve space.

Fig. II is a side elevation of the drilling machine parts and transmission mechanism shown in Fig. I.

Fig. III is a front elevation of a complete drilling machine provided with my improved transmission mechanism.

In the drawings, A designates a drilling machine which comprises a hollow upright standard B having a suitable base flange C at its lower end and a horizontal frame member D at its upper end, said horizontal frame member and said standard being provided with the central opening E which is intended for a purpose to be hereinafter set forth. Secured to and extending upwardly from the horizontal frame member D is a pair of oppositely disposed supporting members F, each of which is provided at its upper end with a bearing G. Extending transversely of the drilling machine and supported in the bearings G is a rotatable shaft H, said shaft being provided with a pulley H' whereby rotary movement is transmitted to said shaft from any suitable source. Arranged at points below the shaft H is a plurality of drills or cutting members J. In the operation of the drilling machine as illustrated in the drawing, rotary motion is transmitted to the shaft H, and motion is transmitted from said shaft H to the drills J to cause said drills to rotate. The mechanism for transmitting motion from the shaft H to the drills J is not shown in the drawing, because of the fact that said mechanism is of common construction, and for the additional reason that it does not form a part of the present invention. For the purpose of obtaining a clear idea of the present invention, it is only necessary to know that the rotation of the shaft H causes the drills J to rotate about their vertical axes.

Secured to the horizontal frame member D and extending downwardly therefrom is a supporting member 1, by which the several parts of my transmission device are supported, said supporting member being secured to a portion of said horizontal frame member by means of bolts 2 and to the standard B by means of a bolt 3. Arranged on the supporting member 1 is a bearing 4, said bearing being preferably formed integral with said supporting member. Mounted in the bearing 4 and arranged to rotate therein is a shaft 5, said shaft being provided with a worm wheel 6 at one of its ends which is fixed to said shaft and adapted to rotate therewith. Located below the worm wheel 6 is an arm 7 which is pivoted at the point indicated by the reference character 8 to the supporting member 1, said pivotal connection being effected by means of a bolt 9, which passes through said supporting member 1 and into said arm 7. Arranged on the pivoted arm 7 is an integral member 7', which includes a pair of bearings 10 which are spaced apart, one from the other, and located at the opposite end of said arm is a bearing 11. The bearings 10 and the bearing 11 support a rotatable shaft 12, which extends longitudinally of said pivoted arm, and said shaft is provided at its outer end with a pulley 13 whereby said shaft may be rotated. Arranged between the bearings 10 is a worm 14 which is adapted to mesh with the wheel 6 to impart rotary movement thereto.

Pivotally secured at the point indicated by the reference character 15 to a downwardly extending portion 16 of the supporting member 1 is an arm 17, the rearmost portion of said arm being in engagement with the lower face of the member 7' and the forward portion thereof being extended outwardly beyond the standard B (Fig. II). Pivoted to the standard B at a point below the arm 17 is a foot lever 18, said foot lever being connected to the forward end of the arm 17 by means of a rod 19.

As pointed out above, the arm 7 is pivoted, and as the free end of said arm is movable toward and away from the worm wheel 6, it is obvious that the worm 14 may be engaged with or disengaged from said worm wheel. Normally the worm 14 is disengaged from the worm wheel 6, and to compel the arm 7 to remain in such position I employ a rod 20, which is flexibly attached to the member 7' of said arm 7. The rod 20 passes through an L-shaped member 21, which is secured to the standard B and is provided at its lower end with a plate 22. Interposed between a portion of the L-shaped member 21 and the plate 22 is an expansive coil spring 23. It is apparent from the foregoing that the downward pressure exerted by the coil spring 23 on the plate 22 will force said plate and the rod 20 downwardly, and because said rod is attached to the arm 17 it is plain that the free end of said arm will be drawn downwardly. As stated above, the worm 14 is normally disengaged from the worm wheel 6, and when it is desired to cause said worm to engage said worm wheel it is only necessary for the operator to depress the foot lever 18, whereby the rearmost end of the pivoted lever 17 will be moved upwardly, thereby moving the free end of the arm 7 upwardly against the pressure of the spring 23 and bringing the worm, which is supported by said free end of said arm, into engagement with said worm wheel. The supporting member 1 is provided with a pair of elongated slots 24, into which a pair of stationary pins 25 on the arm 7 extend whereby said arm 7 is guided as it moves, and the lower walls of said slots act as stops to limit the downward movement of the free end of said arm 7.

Arranged on the supporting member 1 at a point above the bearing 4 is a similar bearing 26, said bearing 26, like the bearing 4, being preferably formed integral with said supporting member 1. The bearing 26 supports a shaft 27, which is adapted to oscillate within said bearing, and said shaft is provided at one of its ends with an arm 28. The arm 28 is provided with a groove 29 which comprises a longitudinal portion 30 and a lateral portion 31. The lateral portion 31 of the groove 29 extends to a side edge of the arm 28, so that a suitably shaped member might pass from the outside of said arm through said lateral portion 31 of the groove into the longitudinal portion thereof. The opposite end of the shaft 27 is provided with a toothed segment 32, which is mounted on said shaft and oscillates therewith.

The drilling machine illustrated in the drawing is provided with a movable work-supporting table T, which is provided with a downwardly extending portion 33, which extends into the opening E formed in the standard B of said drilling machine, and secured to said portion 33 and movable therewith is a rack 34, said standard being provided with an elongated slot 35 whereby a portion of said rack is exposed. The toothed segment 32 already mentioned extends through the elongated slot 35, and the teeth of said segment mesh with the teeth of the rack 34, whereby oscillatory movement imparted to said segment will impart vertical movement to said table T.

Mounted on the rotatable shaft 5 adjacent to the worm wheel 6 thereon is a disk 36, said disk being fixed to said shaft and rotatable therewith, and said disk being provided with a projection 37 which extends outwardly from said disk. In the assembled drilling machine, the disk 36 and the arm 28 are located adjacent to each other (Fig. II) so that the projection 37 may enter the groove 29 in said arm 28 in a manner and for a purpose to be hereinafter set forth.

It would perhaps be well at this point to explain the operation of the mechanism thus far described. Assume that the work to be drilled has been placed on the work-receiving table T of the drilling machine and it is desired that said table T be moved toward the drills J. Assume also that rotary motion is being imparted to the worm 14 through the rotation of the pulley 13 and the shaft 12. The free end of the pivoted arm 7, it will be remembered, is normally drawn downwardly by the spring 23 so that the worm 14 is out of engagement with the worm wheel 6. With the various parts in the positions suggested, the operator depresses the foot lever 18 whereby the forward end portion of the pivoted arm 17 is drawn downwardly and the rearmost end portion of said arm moved upwardly. The upward movement of said rear portion of said pivoted arm 17 will carry with it the free end of the pivoted arm 7, and the teeth of the worm 14 will be caused to engage the teeth of the worm wheel 6 whereby said worm wheel and the shaft 5 on which it is mounted will be rotated. The disk 36, being fixed to the shaft 5, will be rotated with said shaft, and when the projection on said disk reaches the proper position it will pass through the portion 31 of the groove in the arm 28 to the portion 29 of said groove. As the projection 37 continues to move in the direction indicated by the arrow in Fig. I, it will contact with the wall 30' of said groove, and as a result the arm 28 will be carried around with said projection, thereby oscillating the shaft 27, and through the instrumentality of the toothed segment 32 and rack 34 cause the work-supporting table T to move upwardly toward the drills J. In describing a complete circle the projection 37 on the disk 36 passes into the groove 29 when the arm 28 is in the position in which it is shown in Fig. I of the drawing, and said projection then passes downwardly into the portion 30 of said groove to the bottom thereof, and then moves upwardly in said groove; and as said projection is bearing against the wall 30' of said groove, the arm 28 will be swung to the left in Fig. I. When the projection reaches the upper extremity of the wall 30', said projection will pass into the portion 31 of the groove, thus permitting the weight of the work-supporting table T to cause said table to move downwardly very rapidly and return the arm 28 to its starting position.

To cause the arm 28 to stop at the proper place, I provide said arm with a lug 38 which is adapted to be engaged by an adjusting screw 39, said adjusting screw being capable of manipulation, so that the exact stopping position of said arm 28 may be regulated.

It may be desired to adjust the work-receiving table T of the drilling machine vertically independent of the operating mechanism, so that the proper upward movement of said table may be obtained, and this adjustment may be obtained by mechanism which will now be described. 41 designates an arm which is fixed to the shaft 27, said arm supporting at its outer end an adjusting screw 42. The adjusting screw 42 passes through an internally threaded opening in the arm 41, whereby said adjusting screw may be moved longitudinally of said threaded opening. Arranged on the toothed segment 32 is a projection 43 which is adapted to be engaged by the lower end of the adjusting screw 42. In the use of the machine, assume that the drills have become worn, or that shorter drills have been substituted for comparatively long ones. In this event it is apparent that because the arm 28 has a fixed throw, the work table would not move high enough to cause the drills to pass entirely through the work, and to adjust the work-receiving table T so that it will move to the proper elevation it is necessary only to rotate the adjusting screw 42, thus causing the toothed segment to be rotated slightly on the shaft 27 whereby the work-receiving table is moved upwardly a proportional distance. By the use of the mechanism described it is plain that the work-receiving table may be maintained at such elevation that the drills will pass entirely through the work, regardless of slight variations in the lengths of said drills.

By referring to Fig. III of the drawing, it will be seen that when the arm 28 and the shaft 27 are oscillated by the projection 37 on the disk 36, the arm 41, because it is fixed to said shaft 37, will also be oscillated, and because the adjusting screw 42 is in contact with the projection 43 on the toothed segment 32, said segment will also be oscillated to elevate the work-supporting table. It is also apparent that the weight of the work-supporting table will keep the projection 43 in contact with the end of the adjusting screw 42.

In the operation of machines of the class described, it is desirable that the machine complete one operation and then stop so that the operator may remove the drilled work and place undrilled work in proper position on the work-receiving table. To permit my drilling machine to be operated in this manner, I employ an arm 45 which is pivoted at 46 to a member 47 secured to the standard B of the machine, the lower portion of said arm being urged in a direction away from the standard B and against the pivoted arm 17 by means of a coil spring 48 which is interposed between a portion of said standard B and a portion of said pivoted arm 45. The pivoted arm 45 is provided with a shoulder 49 adjacent to its lower end and a laterally extended portion 45' at its upper end. Mounted on and fixed to the shaft 5 at an end thereof is a crank arm 50 which is provided with an outwardly extended projection 51.

In the operation of the machine, the pivoted arm 17 is drawn downwardly by the depression of the foot lever 18, as already described, and when said arm 17 has been depressed a sufficient distance the spring 48 will cause the arm 45 to move to a position where the shoulder 49 engages the top edge of said arm 17, whereby said arm is held in a depressed position to retain the worm 14 in engagement with the worm wheel 6. It is, of course, apparent that as long the worm and worm wheel are in engagement the drilling machine will be in operation, and as the crank arm 50 is fixed to the shaft 5, said crank arm will rotate with said shaft. When the pivoted arm 45 is in the position it assumes when it is holding the worm 14 in engagement with the worm wheel 6, a portion of the upper end 45' of said pivoted arm is in the path of travel of the projection 51 on the crank arm 50, and as said projection reaches the position of said portion the arm 45 will be moved on its pivot by the projection 51 coming into contact with the cam face 52 of the portion 45, whereby the shoulder 49 will be withdrawn from the top edge of the arm 17, thus permitting the coil spring 23 to disengage the worm 14 from the worm wheel 6. From the foregoing it is apparent that upon each depression of the foot lever 18 the drilling machine will complete one operation and then stop. It is, of course, plain that if desired the operator may hold the foot lever in a depressed position whereby the operation of the machine will be continuous.

The transmission mechanism disclosed in the present application includes the desirable crank arm for lifting the work-receiving table T, but because of its particular arrangement the change in leverage tends to compensate for variations in the crank motion whereby the objectionable variable speed obtained by the use of the crank arms heretofore used in eliminated, and the speed of the work table is approximately uniform throughout its distance of travel.

This approximately uniform speed is due to a constant change in the leverage which occurs while the projection 37 is cooperating with the arm 28. The projection 37 may be regarded as a crank pin moving in a circular path, and if an ordinary connecting rod were used to transmit motion from the crank pin to the lever arm 28, there would be a constant change in the speed of the lever arm. However, in the device herein shown, the crank pin contacts with the lever arm and moves toward and away from its fulcrum 27, thereby imparting an approximately, but not exactly, uniform motion to the lever arm and the mechanism driven by said arm. For example, after the projecting crank pin 37 moves downwardly from the position shown in Fig. I, said pin 37 enters the slot, or groove 29, and it then travels away from the fulcrum 27 of the lever arm. This results in a constant change in the leverage. Immediately after the pin 37 enters the slot 29 it contacts with the wall 30' of said slot to transmit motion to the lever arm 28, and the horizontal displacement of crank pin 37 is then relatively slight, but at this time the pin is operating near the fulcrum 27 of the lever arm. The other extreme occurs when the crank pin 37 is nearing its lowest position, and at this time the horizontal displacement of said pin is relatively great, but it is then operating at a point remote from the fulcrum 27. In other words, when the horizontal displacement of the rotating pin 37 is relatively slight, it lies near the fulcrum of the lever, and as this horizontal displacement is increased the pin moves away from the fulcrum. During the upward motion of the pin 37, its horizontal displacement gradually decreases as said pin approaches the fulcrum 27.

With this explanation as a basis, it will be understood that the crank and lever transmit an approximately uniform motion to the table T during the drilling operation which occurs while the table is moving upwardly. The change in leverage prevents the extreme speed variations that occur when motion in a straight line is derived from a crank and connecting rod, and while the elements shown do not move the table at an absolutely uniform speed, the motion during the drilling operation is so nearly uniform that the drills perform their functions without undue strain on either the drills or the work.

To cushion the downward movement of the work-receiving table T of a drilling machine equipped with my transmission mechanism, I employ a dash pot 53 which is associated with said work-receiving table in a manner to eliminate any danger of said work-receiving table dropping very suddenly when the worm and worm wheel have been disconnected.

In the operation of a drilling machine equipped with my improved transmission mechanism, it is apparent that the danger of the work-supporting table being raised to a position where the drills might enter said table is eliminated, due to the fact that the maximum lift of said work-supporting table is determined by the projection 37 passing from the groove in the oscillatory arm 28.

To provide means for stopping my improved drilling machine before the completion of an operation, I employ a handle 54 which is secured to the pivoted arm 45. By grasping the handle 54 and rocking the arm 45, it is possible to disengage said arm 45 from the pivoted arm 17 whereby the worm 14 will be disengaged from the worm wheel 6.

I claim:

1. A drilling machine having a vertically movable work-supporting table, and operating means whereby said table is lifted and dropped, said operating means including a lever movable to lift said table, and a rotary driving crank movable into and out of engagement with said lever so as to lift and then release the table, said rotary crank being movable lengthwise of said lever, toward and away from the fulcrum thereof, to impart a substantially uniform lifting movement to the table, and said lever being provided with a longitudinal slot, open at one side of the lever, to receive and release said crank, the table being free to drop by gravity when the crank passes out of said slot.

2. In a transmission mechanism for a drilling machine having a movable element, a worm gear to drive said movable element, a worm to drive said gear, a pivoted holder supporting said worm, a spring acting on said holder and tending to disengage the worm from the worm gear, a manually operated arm associated with said holder to force the worm into mesh with said gear, a pivoted latch arm having a shoulder engaged by said manually operated arm to retain the worm in mesh with the gear, a spring holding said latch arm in its operative position, and a rotary tripping member movable into contact with said latch arm to release said shoulder from said manually operated arm.

In testimony that I claim the foregoing I hereunto affix my signature.

BENJAMIN F. BERRY.